United States Patent
Matsubara et al.

(10) Patent No.: US 10,229,063 B2
(45) Date of Patent: Mar. 12, 2019

(54) SEMICONDUCTOR DEVICE, DATA PROCESSING SYSTEM, AND SEMICONDUCTOR DEVICE CONTROL METHOD

(71) Applicant: Renesas Electronics Corporation, Koutou-ku, Tokyo (JP)

(72) Inventors: Katsushige Matsubara, Tokyo (JP); Keisuke Matsumoto, Tokyo (JP); Seiji Mochizuki, Tokyo (JP)

(73) Assignee: Renesas Electronics Corporation, Tokyo ( * ) Notice: Subject to any disclaimer, the term of this patent is extended or adjusted under 35 U.S.C. 154(b) by 0 days.

(21) Appl. No.: 15/358,133

(22) Filed: Nov. 22, 2016

(65) Prior Publication Data

US 2017/0185521 A1  Jun. 29, 2017

(30) Foreign Application Priority Data

Dec. 24, 2015  (JP) .................................. 2015-250937

(51) Int. Cl.
*G06F 12/00* (2006.01)
*G06F 12/0875* (2016.01)
(Continued)

(52) U.S. Cl.
CPC ........ *G06F 12/0875* (2013.01); *G06F 3/0604* (2013.01); *G06F 3/0638* (2013.01);
(Continued)

(58) Field of Classification Search
None
See application file for complete search history.

(56) References Cited

U.S. PATENT DOCUMENTS 5,752,272 A * 5/1998 Tanabe .................... G06F 9/383
711/154
8,001,294 B2   8/2011 Inoue et al.
(Continued)

FOREIGN PATENT DOCUMENTS

JP     H10-27127 A    1/1998
JP     2006-099774 A  4/2006
(Continued)

OTHER PUBLICATIONS

Extended European Search Report dated May 17, 2017, in European Patent Application No. EP16205314.4.
(Continued)

*Primary Examiner* — David Yi
*Assistant Examiner* — Craig S Goldschmidt
(74) *Attorney, Agent, or Firm* — Shapiro, Gabor and Rosenberger, PLLC (57) ABSTRACT

Bus/memory bandwidth consumption caused by reading of auxiliary information not included in compressed data is reduced. A memory stores compressed data and auxiliary information used to read the compressed data. A semiconductor device includes a cache in which auxiliary information stored in the memory is stored, a control unit which, when a read request for reading compressed data stored in the memory is received, reads from the cache auxiliary information about the compressed data, if stored in the cache, or reads the auxiliary information about the compressed data, if not stored in the cache, from the memory and stores the auxiliary information about the compressed data in the cache, and which reads the compressed data from the memory using the auxiliary information about the compressed data, and an expansion unit to expand the compressed data read from the memory.

11 Claims, 8 Drawing Sheets

(51) Int. Cl.
*G06F 3/06* (2006.01)
*G06F 12/02* (2006.01)
*G06F 12/0862* (2016.01)

(52) U.S. Cl.
CPC .......... *G06F 3/0673* (2013.01); *G06F 12/023* (2013.01); *G06F 12/0862* (2013.01); *G06F 2212/1024* (2013.01); *G06F 2212/1044* (2013.01); *G06F 2212/302* (2013.01); *G06F 2212/401* (2013.01); *G06F 2212/466* (2013.01); *G06F 2212/60* (2013.01)

(56) References Cited

U.S. PATENT DOCUMENTS

| 8,316,188 B2 | 11/2012 | Kadambi et al. |
| 2006/0136228 A1* | 6/2006 | Lin ........................ G10H 7/006 704/278 |
| 2006/0206547 A1* | 9/2006 | Kulkarni ............. G06F 11/1451 |
| 2008/0229027 A1 | 9/2008 | Shioya et al. |
| 2010/0077146 A1 | 3/2010 | Hosoda |
| 2010/0138614 A1* | 6/2010 | Glasco ................ G06F 12/0875 711/144 |
| 2013/0339406 A1* | 12/2013 | Kanfi ................ G06F 17/30082 707/825 |

FOREIGN PATENT DOCUMENTS

| JP | 2008-225914 A | 9/2008 |
| JP | 2010-073029 A | 4/2010 |
| JP | 2010-134929 A | 6/2010 |
| WO | WO 2015/142341 A1 | 9/2015 |
| WO | WO 2015/179591 A1 | 11/2015 |

OTHER PUBLICATIONS

Office Action dated Dec. 4, 2018, in Japanese Patent Application No. 2015-250937.

* cited by examiner

SEMICONDUCTOR DEVICE, DATA PROCESSING SYSTEM, AND SEMICONDUCTOR DEVICE CONTROL METHOD

CROSS-REFERENCE TO RELATED APPLICATIONS

The disclosure of Japanese Patent Application No. 2015-250937 filed on Dec. 24, 2015 including the specification, drawings and abstract is incorporated herein by reference in its entirety.

BACKGROUND

The present invention relates to a semiconductor device, a data processing system, and a semiconductor device control method which are used, for example, to store compressed data in an external memory.

Recently, semiconductor devices are widely used which perform various arithmetic processing including image processing. When, in such semiconductor devices, data such as image data is written to a memory or is read from a memory, data is encoded, decoded, compressed, and expanded conforming to a predetermined standard. Concerning reading of compressed data, the techniques disclosed in Japanese Unexamined Patent Application Publication Nos. Hei 10 (1998)-27127 and 2006-099774 are known.

In the technique disclosed in Japanese Unexamined Patent Application Publication No. Hei 10 (1998)-27127, when compressed data is stored in a memory, memory address information indicating where the compressed data is stored is stored in the memory via a bus as auxiliary information for use in reading the compressed data. The address information is used when the compressed data is to be read from the memory.

In the technique disclosed in Japanese Unexamined Patent Application Publication No. 2006-099774, when compressed data is stored in a memory, data size information about the compressed data is stored as auxiliary information in a direct memory access controller (DMAC) via a bus. The data size information is used when the compressed data is to be read from the memory.

SUMMARY

In the techniques disclosed in the above-mentioned patent literature, when reading compressed data from a memory, it is necessary to read auxiliary information via a bus. When the auxiliary information is read, much of the bus/memory bandwidth is consumed.

Other objects and novel features of the present invention will become apparent from the following description and the attached drawings.

According to an embodiment of the present invention, a semiconductor device is provided with a cache for storing auxiliary information stored in a memory. When a request for reading compressed data stored in the memory is received, the semiconductor device reads auxiliary information about the compressed data from the cache, if storing the auxiliary information, and reads the compressed data from the memory using the auxiliary information.

According to the above embodiment, consumption of the bus/memory bandwidth caused by reading of auxiliary information can be reduced.

DETAILED DESCRIPTION

Embodiments of the present invention will be described in the following with reference to the attached drawings. The following description and the accompanying drawings include, where appropriate for clarification of description, omissions and simplifications. The elements represented as functional blocks in the drawings can be configured hardware-wise, for example, with a central processing unit (CPU), memory and other circuits or software-wise, for example, with programs loaded in memory. It will be obvious to those skilled in the art that such functional blocks can be realized in various forms hardware-wise, software-wise, or by combination of hardware and software without being limited to any particular means. In the accompanying drawings, like elements are denoted by like reference numerals and, in the following, duplicate descriptions of like elements are omitted where appropriate.

(1) First Embodiment

<Configuration of Comparison Example>

Figure 1:
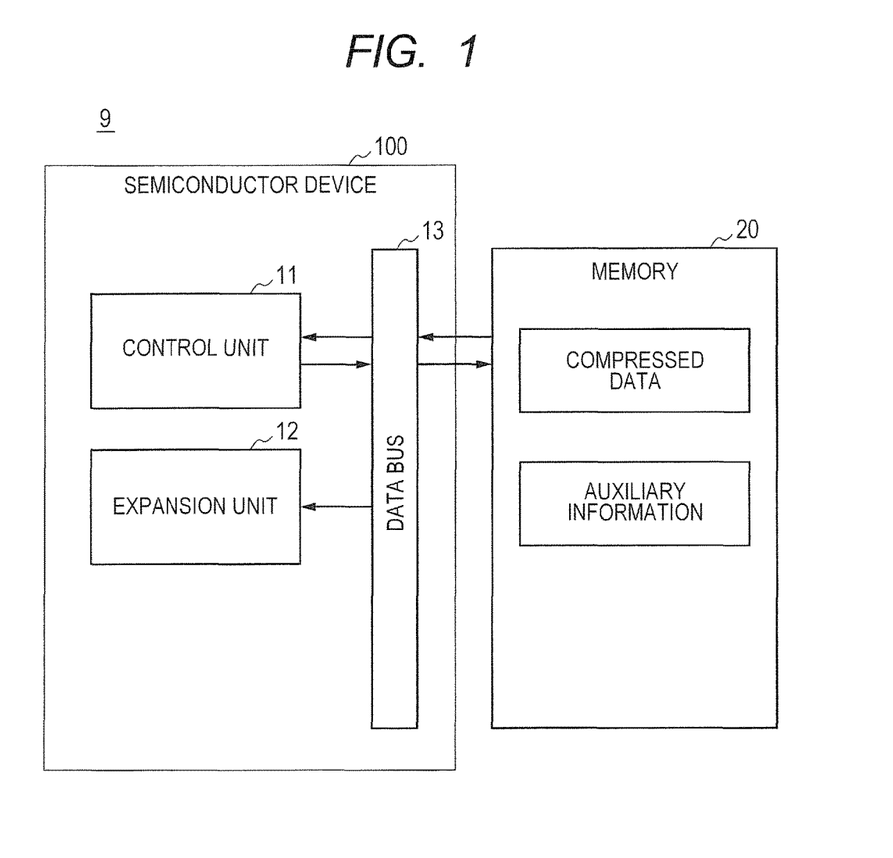
FIG. 1 is a schematic diagram showing the configuration of a data processing system according to a comparison example.

First, to make it easier to understand a first embodiment of the present invention, a comparison example considered by the present inventors will be described. The configuration of a data processing system 9 of the comparison example will be described first. The configuration is shown in FIG. 1. As shown, the data processing system 9 of the comparison example includes a semiconductor device 100, for example, large-scale integration (LSI) and a memory 20 provided outside the semiconductor device 100.

The memory 20 stores compressed data. The memory 20 also stores auxiliary information for use in reading the compressed data. The auxiliary information includes, for example, data size information indicating the data length of compressed data and address information indicating addresses at which compressed data is stored.

The semiconductor device 100 includes a control unit 11, an expansion unit 12, and a data bus 13. The control unit 11 reads compressed data and auxiliary information stored in the memory 20 via the data bus 13. The expansion unit 12 expands the compressed data read from the memory 20 by the control unit 11.

<Operation of Comparison Example>

Figure 2:
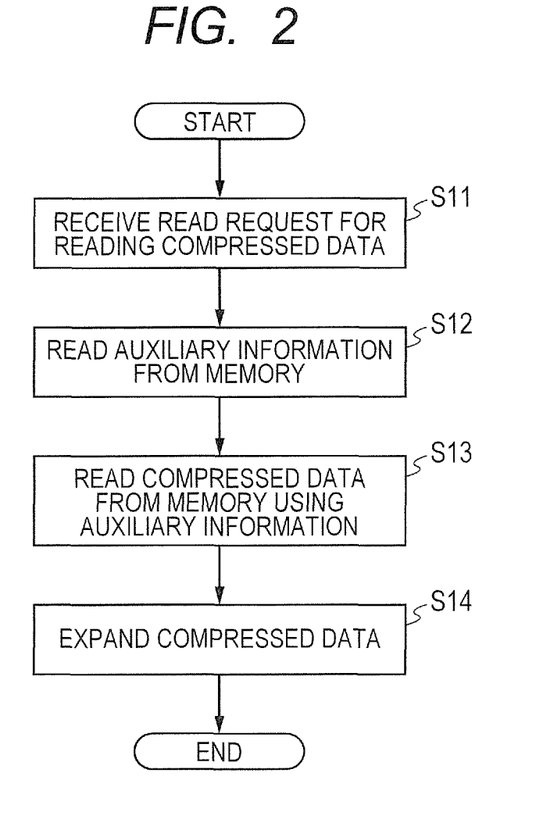
FIG. 2 is a flowchart describing a flow of operation of a semiconductor device according to the comparison example.

Next, operation of the semiconductor device 100 of the comparison example will be described. FIG. 2 shows the flow of operation of the semiconductor device 100 of the comparison example.

As shown in FIG. 2, when a request for reading compressed data stored in the memory 20 is received (step S11), the control unit 11 reads auxiliary information about the compressed data from the memory 20 via the data bus 13 (step S12).

Next, the control unit 11 reads, using the auxiliary information, the compressed data from the memory 20 via the data bus 13 (step S13).

Subsequently, the expansion unit 12 expands the compressed data read from the memory 20 by the control unit 11 (step S14).

As described above, according to the semiconductor device 100 of the comparison example, to read compressed data from the memory 20, it is necessary to read auxiliary information from the memory 20 via the data bus 13. Namely, according to the semiconductor device 100 of the comparison example, every time compressed data is to be read from the memory 20, auxiliary information is read from the memory 20 via the data bus 13. This is a problem in that much of the bus/memory bandwidth is consumed to read auxiliary information not included in compressed data.

According to the present first embodiment of the present invention, the above problem can be solved.

<Configuration of First Embodiment>

Figure 3:
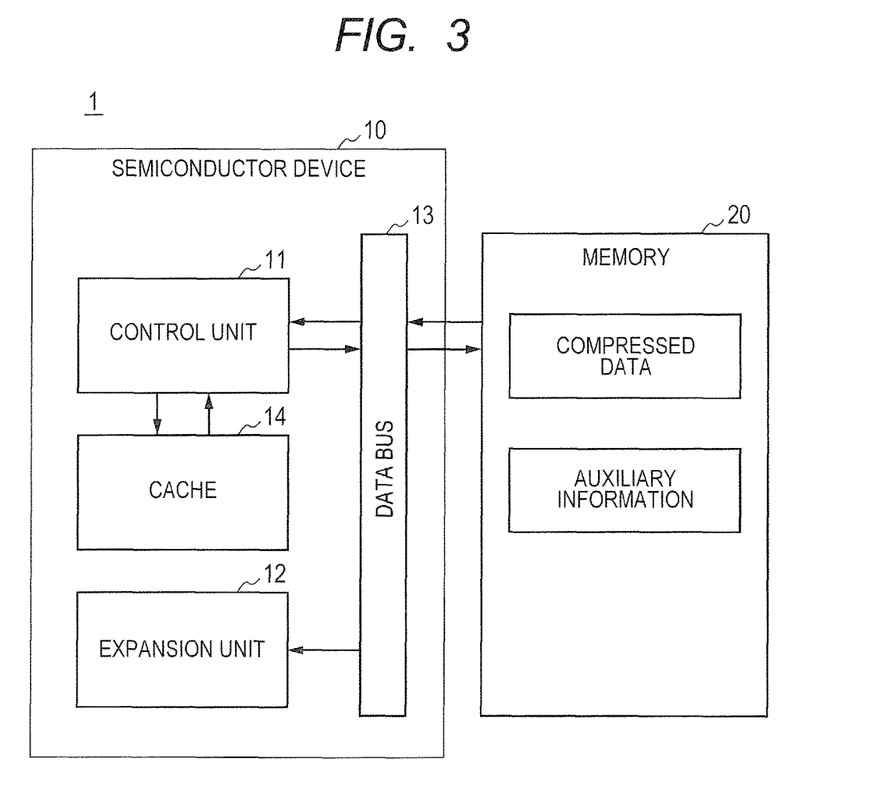
FIG. 3 is a schematic diagram showing the configuration of a data processing system according to a first embodiment of the present invention.

Next, the configuration of a data processing system 1 of the present first embodiment will be described. The configuration is shown in FIG. 3. As shown in FIG. 3, the data processing system 1 of the present first embodiment differs from the data processing system 9 of the comparison example shown in FIG. 1 in that the data processing system 1 includes a semiconductor device 10 instead of the semiconductor device 100 included in the data processing system 9.

Compared with the semiconductor device 100 of the comparison example shown in FIG. 1, the semiconductor device 10 additionally includes a cache 14. The cache 14 stores auxiliary information stored, together with compressed data, in the memory 20.

<Operation of First Embodiment>

Figure 4:
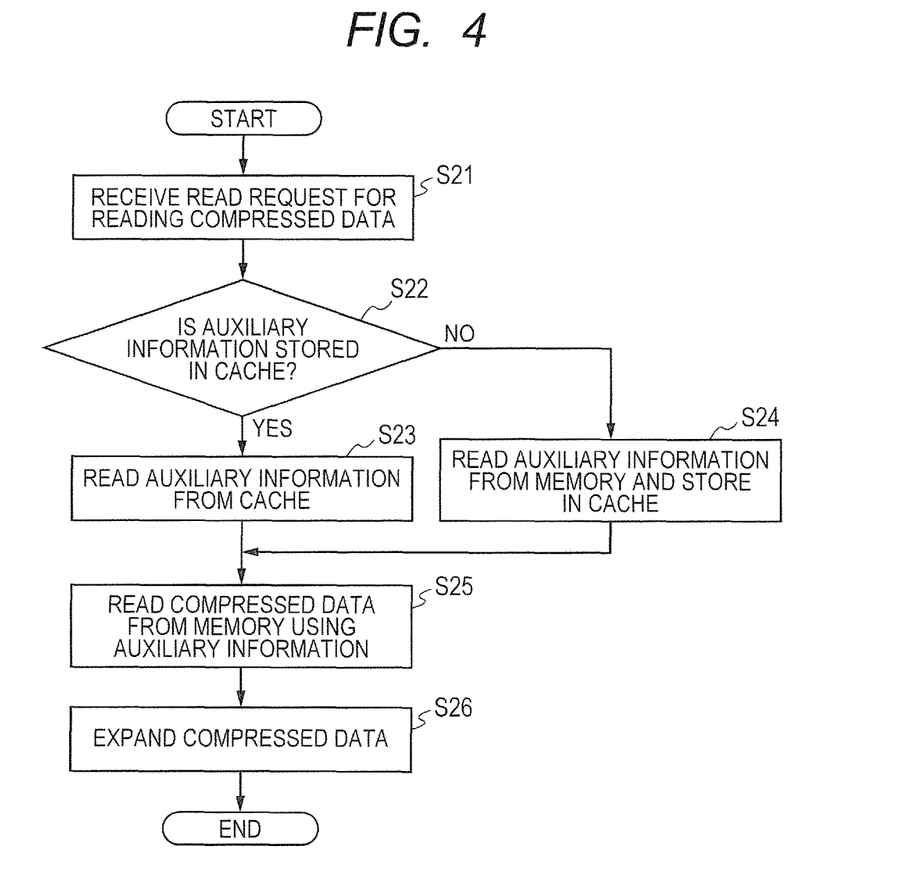
FIG. 4 is a flowchart describing a flow of operation of a semiconductor device according to the first embodiment.

Next, operation of the semiconductor device 10 of the present first embodiment will be described. FIG. 4 shows the flow of operation of the semiconductor device 10 of the present first embodiment.

As shown in FIG. 4, when a request for reading compressed data stored in the memory 20 is received (step S21), the control unit 11 determines whether or not auxiliary information about the compressed data is stored in the cache 14 (step S22).

When it is determined in step S22 that the auxiliary information is stored in the cache 14 (step S22=Yes), the control unit 11 reads the auxiliary information from the cache (step S23).

When it is determined that the auxiliary information is not stored in the cache 14 (step S22=No), the control unit 11 reads the auxiliary information from the memory 20 via the data bus 13 and stores the auxiliary information in the cache 14 (step S24).

Next, the control unit 11 reads, using the auxiliary information, the compressed data from the memory 20 via the data bus 13 (step S25).

Subsequently, the expansion unit 12 expands the compressed data read from the memory 20 by the control unit 11 (step S26).

<Effects of First Embodiment>

According to the present first embodiment, when a request for reading compressed data is received with auxiliary information about the compressed data being stored in the cache 14, the auxiliary information is read from the cache 14 and the compressed data is read from the memory 20 by using the auxiliary information.

Therefore, reading auxiliary information from the memory 20 via the data bus 13 every time when reading compressed data from the memory 20 is avoided, so that consumption of the bus/memory bandwidth caused by reading of auxiliary information is reduced.

(2) Second Embodiment

<Configuration of Second Embodiment>

A second embodiment of the present invention is equivalent to a more specific version of the configuration of the first embodiment.

<Configuration of Data Processing System of Second Embodiment>

Figure 5:
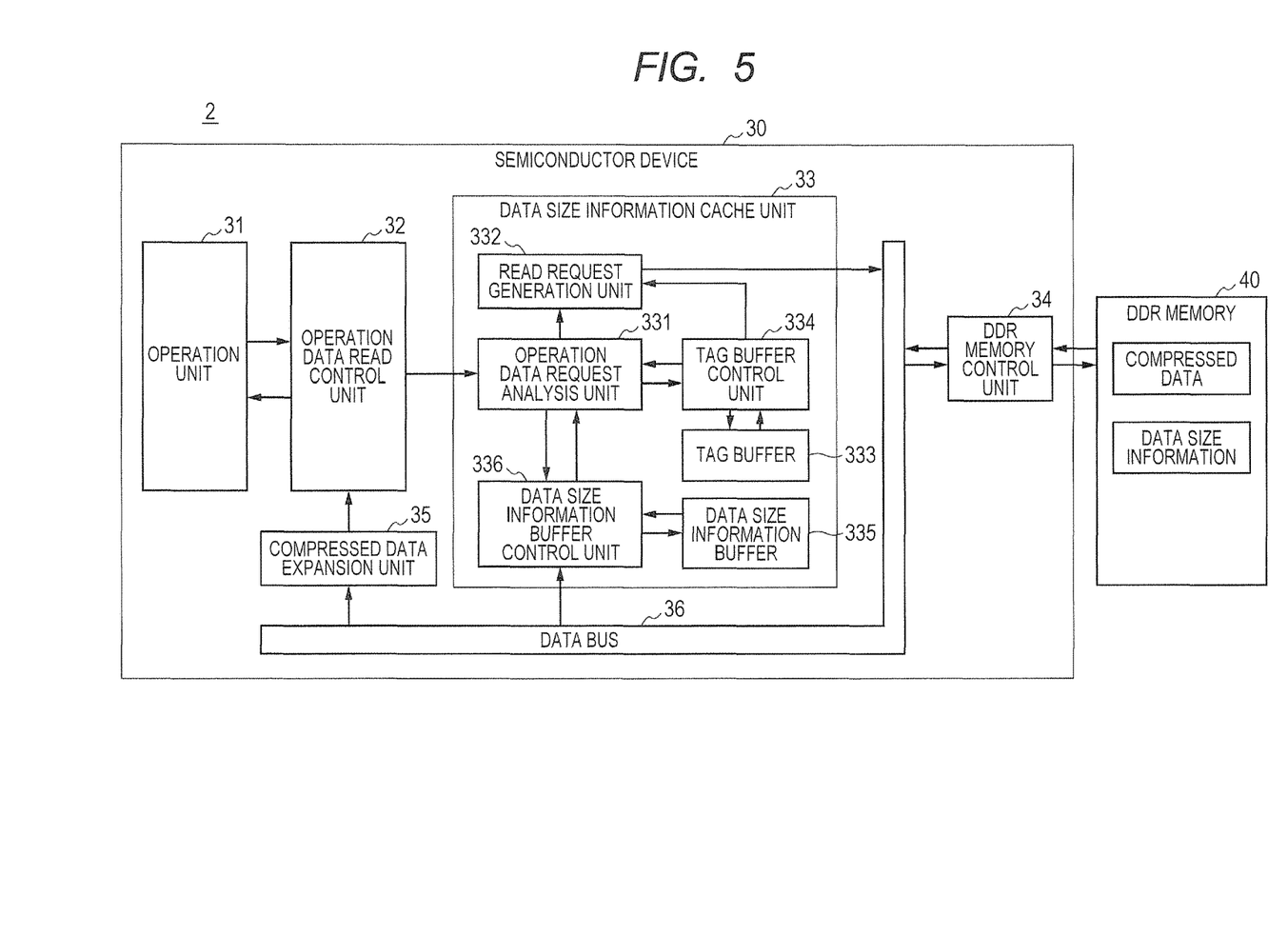
FIG. 5 is a schematic diagram showing the configuration of a data processing system according to second and third embodiments of the present invention.

First, the configuration of a data processing system 2 of the present second embodiment will be described. The configuration is shown in FIG. 5. As shown in FIG. 5, the data processing system 2 of the present second embodiment includes a semiconductor device 30, for example, an LSI and a double data rate (DDR) memory 40 provided outside the semiconductor device 30. The semiconductor device 30 and the DDR memory 40 respectively correspond to the semiconductor device 10 and the memory 20 shown in FIG. 3.

The semiconductor device 30 compresses data outputted from an operation unit 31, being described later, included in the semiconductor device 30 and stores the compressed data in the DDR memory 40. At this time, the semiconductor device 30 also stores auxiliary information for use in reading the compressed data in the DDR memory 40. In the present second embodiment, the auxiliary information is assumed to be data size information indicating the data length of the compressed data.

Figure 6:
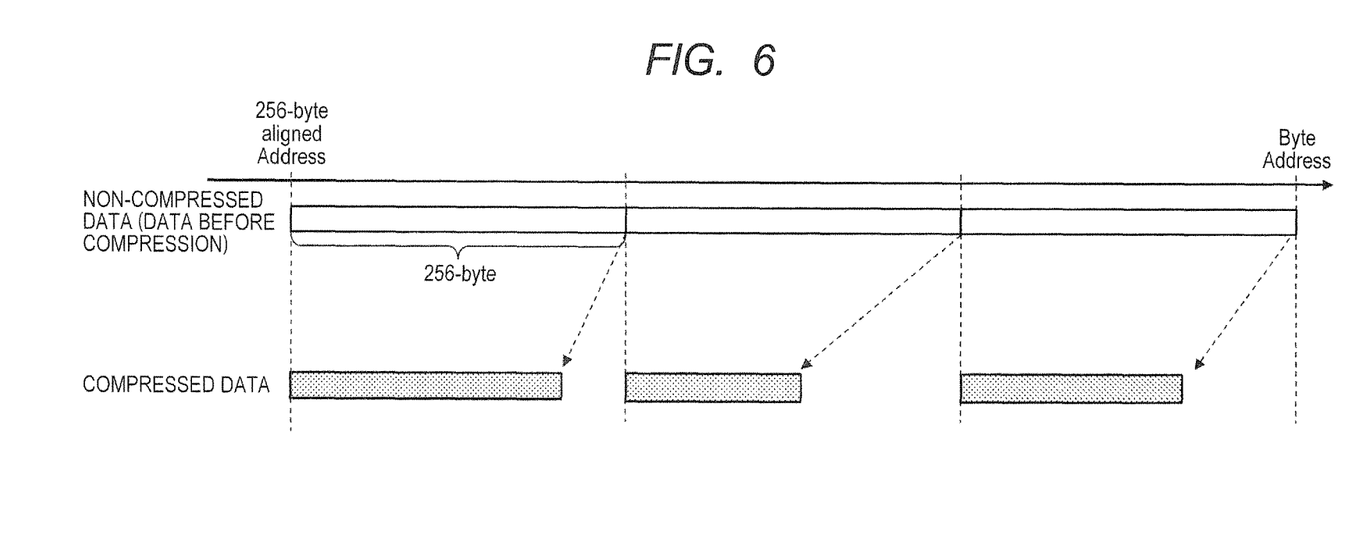
FIG. 6 is a diagram illustrating compressed data according to the second and third embodiments.

A method of storing compressed data used in the present second embodiment will be described below. FIG. 6 is a schematic diagram conceptually showing compressed data storage. In the present second embodiment, the semiconductor device 30 compresses data as shown in FIG. 6 and stores the compressed data in the DDR memory 40.

For example, the semiconductor device 30 compresses data outputted from the operation unit 31 in 256-byte units. Each unit of compressed data has a shorter data length than before being compressed. Therefore, plural units of compressed data stored in order in the DDR memory 40 have data addresses shifted from their data addresses before being compressed. Hence, to make it possible to directly access the compressed data at addresses shifted from before compression, it is necessary to keep the data addresses before and after compression memorized in a mutually related state.

As shown in FIG. 6, therefore, the semiconductor device 30 stores each unit of compressed data to begin at the top address of the corresponding 256-byte non-compressed data (data before compression). Namely, when storing each unit of compressed data, the semiconductor device 30 stores only the compressed data without changing the top address of each unit of the compressed data from the top address of the corresponding 256-byte data before compression.

Thus, in the present second embodiment, the top address of each unit of compressed data stored is the same as the top address of the corresponding 256-byte unit of non-compressed data. This makes it unnecessary to memorize the data address before compression of each 256-byte unit of non-compressed data, for example, the top address of each buffer. Also, it is possible to access optional units of compressed data in any order (random access).

When reading desired compressed data from the DDR memory 40, the semiconductor device 30 reads the compressed data beginning at the top address of the corresponding 256-byte unit. At this time, since the compressed data is shorter in data length than before being compressed, it is not necessary to read the entire 256-byte unit. Only the portion corresponding to the data length after compression is required to be read.

In the present second embodiment, when reading desired compressed data, the semiconductor device 30 uses the address (the same as the address before compression) on the DDR memory at which the desired compressed data is stored and the data size information indicating the data length of the desired compressed data.

When storing the compressed data in the DDR memory 40, the semiconductor device 30 also stores, as auxiliary information, data size information about the compressed data in the DDR memory 40. At this time, the order of storing the compressed data in the DDR memory 40 and the order of storing the data size information about the compressed data in the DDR memory 40 are the same. Therefore, from the address on the DDR memory 40 at which the desired compressed data is stored, the address on the DDR memory 40 at which the data size information about the desired compressed data (hereinafter may also be referred to as "required data size information" where appropriate) is stored can be known. Thus, the required data size information can be read from the DDR memory 40.

<Configuration of Semiconductor Device 30 of Second Embodiment>

Next, the configuration of the semiconductor device 30 of the present second embodiment will be described. As shown in FIG. 5, the semiconductor device 30 includes the operation unit 31, an operation data read control unit 32, a data size information cache unit 33, a DDR memory control unit 34, a compressed data expansion unit 35, and a data bus 36. The element configured with the operation data read control unit 32, the data size information cache unit 33 (but, excluding a data size information buffer 335 being described later), and the DDR memory control unit 34 corresponds to the control unit 11 shown in FIG. 3, and the compressed data expansion unit 35 corresponds to the expansion unit 12 shown in FIG. 3.

The operation unit 31 performs arithmetic processing, for example, image processing. Data outputted from the operation unit 31 is compressed as shown in FIG. 6 and is then stored in the DDR memory 40. Note that, since the present second embodiment is characterized mainly by a configuration related with reading of compressed data stored in the DDR memory 40, the elements related with data compression are omitted in FIG. 5.

When reading desired compressed data from the DDR memory 40, the operation unit 31 sends a read request (read command) for reading the desired compressed data to the operation data read control unit 32. The read request includes the data address before compression of the desired compressed data (the same address as the address on the DDR memory 40 at which the desired compressed data is stored) and the data length before compression of the desired compressed data. For example, when the operation unit 31 performs image processing, since the location of desired data on an image and the location of the desired data on the DDR memory 40 correspond to each other, the operation unit 31 may include, in the read request, the address on the DDR memory 40 corresponding to the location of the desired data on the image. The data address and data length before compression are requested by the operation unit 31, because it is not known to the operation unit 31 that the data has been compressed.

The operation data read control unit 32 performs control related with reading of compressed data stored in the DDR memory 40. For example, when a read request is received from the operation unit 31, the operation data read control unit 32 transfers the read request to the data size information cache unit 33.

When the read request is received from the operation unit 31 via the operation data read control unit 32, the data size information cache unit 33 determines whether or not the data size information about the compressed data requested by the read request received is stored in the data size information buffer 335 being described later. When the data size information is not stored in the data size information buffer 335, the data size information cache unit 33 reads the data size information stored in the DDR memory 40 via the data bus 36 and stores the data size information in the data size information buffer 335. Based on the data size information, the data size information cache unit 33 replaces the data length included in the read request received from the operation unit 31 with the data length after compression of the compressed data, then sends the read request to the DDR memory control unit 34 via the data bus 36.

The DDR memory control unit 34 controls the DD memory 40. For example, when a read request is received from the data size information cache unit 33, the DDR memory control unit 34 reads, based on the read request, compressed data from the DDR memory 40. To be specific, the DDR memory control unit 34 reads, from the address included in the read request, compressed data of the data length included in the read request.

The compressed data expansion unit 35 receives the compressed data read by the DDR memory control unit 34 via the data bus 36 and expands the compressed data. The data expanded by the compressed data expansion unit 35 is sent to the operation unit 31 via the operation data read control unit 32.

<Configuration of Data Size Information Cache Unit 33 of Second Embodiment>

Next, the configuration of the data size information cache unit 33 of the present second embodiment will be described. As shown in FIG. 5, the data size information cache unit 33 includes an operation data request analysis unit 331, a read request generation unit 332, a TAG buffer 333, a TAG buffer control unit 334, a data size information buffer 335, and a data size information buffer control unit 336. The data size information buffer 335 corresponds to the cache 14 shown in FIG. 3. The other elements configuring the data size information cache unit 33 correspond to the elements configuring the control unit 11 shown in FIG. 3.

The data size information buffer 335 stores data size information stored in the DDR memory 40.

The TAG buffer 333 stores management information indicating the data size information stored in the data size information buffer 335. In the present second embodiment, the management information indicates the addresses on the DDR memory 40 of the data size information stored in the data size information buffer 335.

When a read request for reading desired compressed data from the operation unit 31 via the operation read control unit 32 is received, the operation data request analysis unit 331 analyzes the read request and performs processing based on the result of analysis. For example, the operation data request analysis unit 331 obtains, based on the address included in the read request, the address on the DDR memory 40 at which the data size information about the desired compressed data is stored and passes the obtained address to the TAG buffer control unit 334.

The TAG buffer control unit 334 controls the TAG buffer 333. For example, when an address is received from the operation data request analysis unit 331, the TAG buffer control unit 334 determines, based on management information stored in the TAG buffer 333, whether or not the required data size information stored at the address is stored in the data size information buffer 335. When the data size information is not stored in the data size information buffer 335, the TAG buffer control unit 334 instructs the read request generation unit 332 to generate a read request for reading the required data size information stored in the DDR memory 40. Also, the TAG buffer control unit 334 stores, in the TAG buffer 333, management information about the required data size information for which the TAG buffer control unit 334 instructed read request generation.

The data size information buffer control unit 336 controls the data size information buffer 335. For example, when the required data size information is read from the DDR memory 40 by the DDR memory control unit 34, the data size information buffer control unit 336 receives the data size information via the data bus 36 and stores the data size information in the data size information buffer 335. When there is no available space left in the data size information buffer 335, the data size information buffer control unit 336, for example, discards the oldest data size information stored in the data size information buffer 335 and stores the new data size information in the buffer area vacated by the oldest data size information.

When the required data size information is read from the data size information buffer 335 or the DDR memory 40, the operation data request analysis unit 331 determines the data length of the desired compressed data based on the data size information. The operation data request analysis unit 331 then instructs the read request generation unit 332 to replace the data length included in the read request received from the operation unit 31 with the data length of the desired compressed data.

The read request generation unit 332 generates the read request as instructed by the operation data request analysis unit 331 or the TAG buffer control unit 334 and sends the read request generated to the DDR memory control unit 34 via the data bus 36.

<Operation of Second Embodiment>

Figure 7:
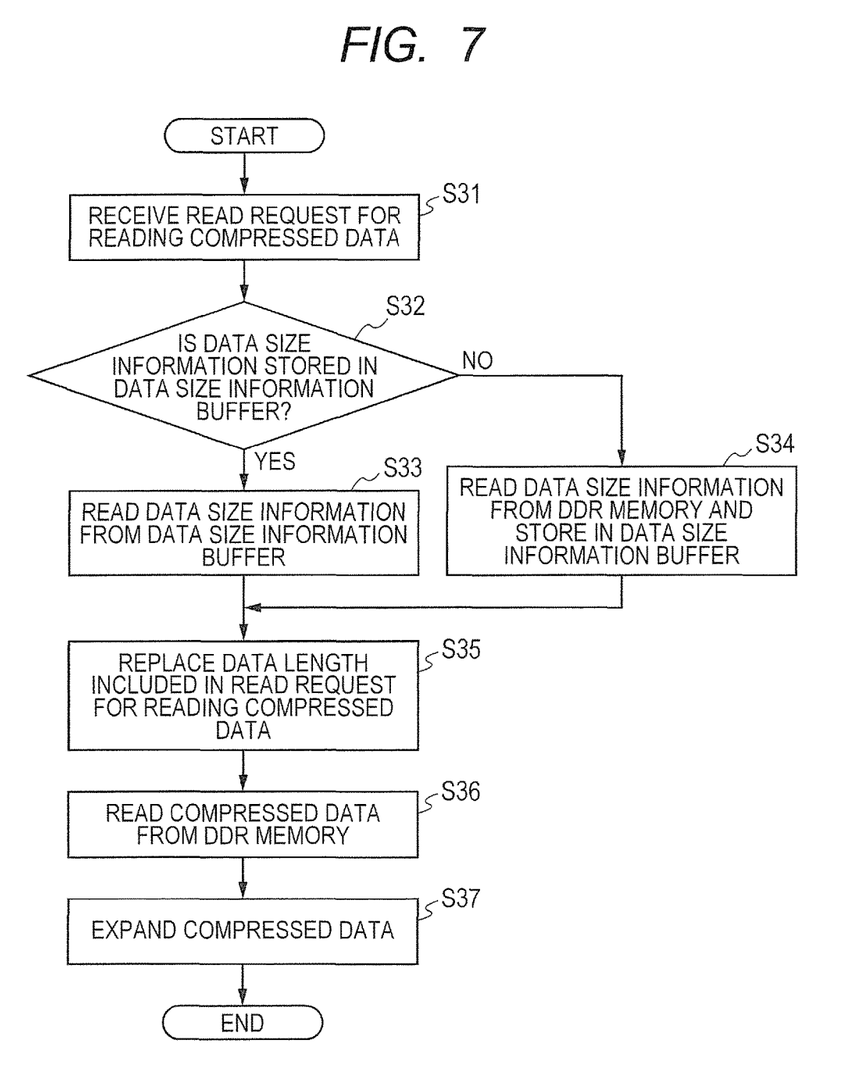
FIG. 7 is a flowchart describing a flow of operation of a semiconductor device according to the second embodiment.

Next, operation of the semiconductor device 30 of the present second embodiment will be described. FIG. 7 shows the flow of operation of the semiconductor device 30 of the present second embodiment.

As shown in FIG. 7, the operation data request analysis unit 331 receives, from the operation unit 31 via the operation data read control unit 32, a read request for reading desired compressed data (step S31). The read request includes the data address before compression of the desired compressed data (the same address as the address on the DDR memory 40 at which the desired compressed data is stored) and the data length before compression of the desired compressed data. The operation data request analysis unit 331 obtains, based on the address included in the received read request, the address on the DDR memory 40 at which the data size information about the desired compressed data is stored and passes the obtained address to the TAG buffer control unit 334. Subsequently, the TAG buffer control unit 334 determines, based on the management information stored in the TAG buffer 333, whether or not the data size information stored at the address obtained from the operation data request analysis unit 331 is stored in the data size information buffer 335 (step S32).

When it is determined in step S32 that the data size information is stored in the data size information buffer 335 (step S32=Yes), the data size information buffer control unit 336 reads the data size information from the data size information buffer 335 (step S33).

On the other hand, when it is determined in step S32 that the data size information is not stored in the data size information buffer 335 (step S32=No), the read request generation unit 332 generates, under the control of the TAG buffer control unit 334, a read request for reading the required data size information and sends the generated read request to the DDR memory control unit 34 via the data bus 36. Responding to the read request, the DDR memory control unit 34 reads the required data size information from the DDR memory 40. The data size information read from the DDR memory 40 is received by the data size information buffer control unit 336 via the data bus 36. The data size information buffer control unit 336 stores the received data size information in the data size information buffer 335 (step S34). Also, the TAG buffer control unit 334 stores management information about the data size information in the TAG buffer 333.

Subsequently, the operation data request analysis unit 331 determines, based on the data size information, the data length of the desired compressed data. The read request generation unit 332 replaces, under the control of the operation data request analysis unit 331, the data length included in the read request received from the operation unit 31 with the data length of the compressed data (step S35).

Next, the read request generation unit 332 sends the read request including the data length replaced in step S35 to the DDR memory control unit 34 via the data bus 36. Responding to the read request, the DDR memory control unit 34 reads the desired compressed data from the DDR memory 40 (step S36).

Subsequently, the compressed data expansion unit 35 receives the compressed data read from the DDR memory 40 via the data bus 36 and expands the compressed data (step S37). The data expanded in the compressed data expansion unit 35 is sent to the operation unit 31 via the operation data read control unit 32.

<Effects of Second Embodiment>

Next, the effects of the present second embodiment will be described. According to the present second embodiment, when a request for reading compressed data is received with the data size information about the compressed data being stored in the data size information buffer 335, the data size information is read from the data size information buffer 335 and, using the data size information, the compressed data is read from the DDR memory 40.

Therefore, reading of data size information from the DDR memory 40 via the data bus 36 every time when reading compressed data from the DDR memory 40 is avoided, so that consumption of the bus/memory bandwidth caused by reading of data size information is reduced.

<Specific Configuration Example of Second Embodiment>

Next, a specific configuration example to realize the present second embodiment will be described.

The operation unit 31 is assumed to be a decoder complying with the video compression standard H.264.

The compression method used is for lossless compression and, in the method, variable-length compressed data is generated. To be specific, data outputted from the operation unit 31 is compressed in units (256 bytes each) of 64×4 pixel blocks (64 pixels horizontally by 4 lines vertically) and the compressed data is managed after being rounded into units of four data lengths, i.e. 64 bytes, 128 bytes, 192 bytes and 256 bytes. The data size information is composed of two bits per 64×4 pixel block. Also, the order of storing the compressed data in the DDR memory 40 and the order of storing data size information about the compressed data in the DDR memory 40 are the same.

The DDR memory 40 is assumed to be an LPDDR4 (low power DDR4).

According to the H.264 standard, a moving image is compressed in units of pictures and into three types of pictures, I/P/B.

An I picture is generated by compressing a picture using data available from the picture itself and can be decoded by itself. A P/B picture is generated by compressing a picture based on the difference between the picture and the results of earlier picture decoding (an earlier decoded picture). Hence, the P/B picture can be made smaller in data size after compression than the I picture. In generating difference data required to generate a P/B picture, data on any part of a decoded image being referred to may be selected. For example, data on such a part as to minimize the data volume after compression may be selected.

The decoded picture referred to in generating a P/B picture is also referred to as a "reference plane." To generate difference data, reference planes for luminance and for color difference are required. According to the H.264 standard, up to 32 each reference planes for luminance and for color difference, totaling 64 planes, can be used.

Concrete effects of the present second embodiment specifically configured as described above will be described below.

In the present second embodiment, when a read request for reading compressed data is received with the data size information about the compressed data being stored in the data size information buffer 335, the compressed data is read from the DDR memory 40 using the data size information stored in the data size information buffer 335. In this way, reading of data size information from the DDR memory 40 via the data bus 36 every time when reading compressed data from the DDR memory 40 is avoided.

If it is necessary to read data size information from the DDR memory 40 via the data bus 36 every time when reading compressed data, the bus/memory bandwidth consumed every time when two bits of data size information is read will be virtually equivalent to the consumption caused by reading 128 bytes of data. This will be described with reference to FIG. 8.

Figure 8:
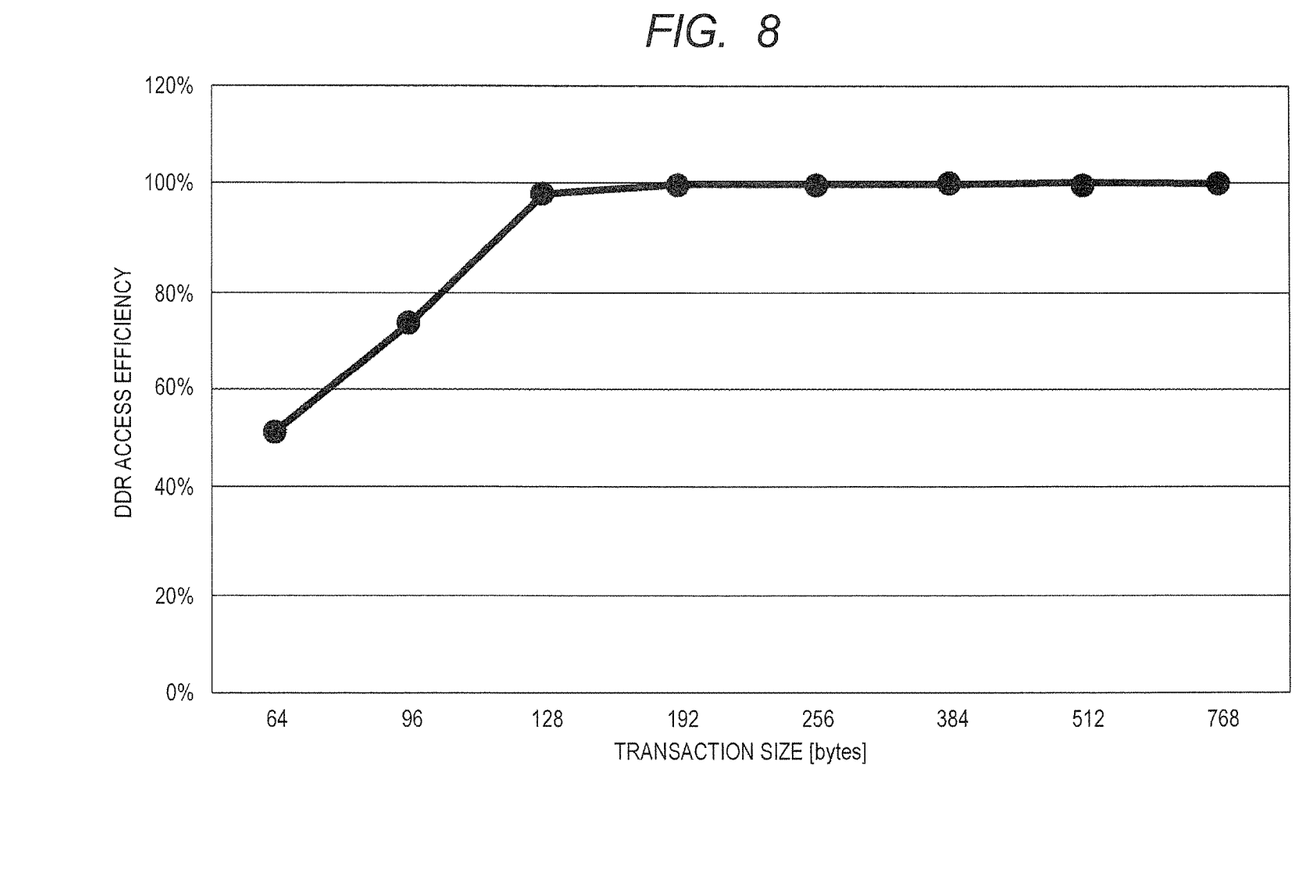
FIG. 8 is a graph showing relationship between data length and memory access efficiency.

FIG. 8 shows a graph of transfer efficiency (access efficiency) of the DDR memory 40 per data transfer length. As shown, while the transfer efficiency is nearly 100% when the data transfer length is 128 bytes or longer, the transfer efficiency increasingly lowers as the data transfer length becomes increasingly shorter than 128 bytes. For example, when the data transfer length is 64 bytes, the transfer efficiency is about 50%, that is, a period in which data cannot be transferred occurs at a rate of once per two transfers. Thus, when the data transfer length is shorter than 128 bytes, periods during which data cannot be transferred occur, making the data transfer virtually equivalent to a data transfer of 128 bytes. Therefore, reading two bits of data size information is virtually equivalent to reading data with a data length of 128 bytes. In the present second embodiment, as long as required data size information is stored in the data size information buffer 335, reading of data size information from the DDR memory 40 via the data bus 36 does not occur, so that consumption of the bus/memory bandwidth is reduced.

Also, according to FIG. 8, when reading data size information, it is desirable to read data size information of a predetermined unit for reading together. For example, it is desirable to read 128 bytes of data size information including required data size information (two bits) together. In this case, the read request generation unit 332 generates a read request for reading 128 bytes of data size information counted from the address of the required data size information together. Compared with reading plural pieces of two-bit data size information individually, reading data size information of a predetermined unit for reading together as described above further reduces bus/memory bandwidth consumption.

Also, if, without storing any data size information in the DDR memory 40, all data size information is to be stored in a static random access memory (SRAM), not shown, included in the operation unit 31, a 96 Kbyte SRAM is required in the case of full HD resolution though also dependent on the image size (as 64 times 1.5 Kbytes are required for 64 reference planes).

In the present second embodiment, on the other hand, data size information about 64 reference planes is managed using 128 bytes per reference plane, and the total memory space required is about 8 Kbytes, i.e. the data size information buffer 335 may be an 8 Kbyte SRAM.

(3) Third Embodiment

<Configuration and Operation of Third Embodiment>

First, a configuration and operation of a third embodiment of the present invention will be described. The third embodiment is similar to the second embodiment in configuration, but differs from the second embodiment in operation.

In the second embodiment, data size information of a predetermined unit for reading (e.g. a unit of 128 bytes) is read together and is stored in the data size information buffer 335.

In the present third embodiment, when data size information of a predetermined unit for reading is read, the data size information of the next unit contiguous in address from the first-read unit is also read, as advance reading, and is also stored in the data size information buffer 335. In this case, the read request generation unit 332 generates a read request for reading 128 bytes of data size information from a desired address and also for reading, as advance reading, the next 128 bytes of data size information that is contiguous in address from the first-read 128 bytes of data size information.

In the present third embodiment, when available capacity is not left in the data size information buffer 335, the oldest data size information is assumed to be discarded. In this way, depending on the capacity of the data size information buffer 335, when advance reading of data size information takes place as described above, the data size information first read in the same read operation may possibly be discarded from the data size information buffer 335.

It is therefore desirable that the read request generation unit 332 determines whether or not to make such advance reading of data size information based on the capacity of the data size information buffer 335. For example, such advance reading of data size information is preferably made only when the data size information buffer 335 has a capacity not smaller than two times the predetermined unit for reading data size information. This will prevent, in data size information reading, the first-read unit of data size information from being discarded from the data size information buffer 335 as a result of subsequent advance reading of the next unit of data size information.

<Effects of Third Embodiment>

Next, effects of the present third embodiment of the present invention will be described. According to the present third embodiment, when data size information of a predetermined unit for reading is read, the data size information of the next unit for reading contiguous in address from the preceding unit for reading is also read, as advance reading, and is stored in the data size information buffer 335.

For example, there are cases in which, when the operation unit 31 reads compressed data which is locally randomly located, the compressed data is generally located in order of address. In such cases, when some data size information is read as advance reading as in the present third embodiment, a processing delay (miss penalty) caused when required data size information is not found in the data size information buffer 335 can be prevented. This prevents deterioration of the processing performance of the operation unit 31.

Other effects of the present third embodiment are similar to those of the second embodiment.

<Specific Configuration Example of Third Embodiment>

Next, a specific configuration example to realize the present third embodiment will be described. The present third embodiment is assumed to be realized using a configuration similar to the specific configuration example of the second embodiment.

According to the H.264 standard, as described above, up to 32 each reference planes for luminance and for color difference, totaling 64 planes, can be used. In reality, however, there are many cases in which the operation unit 31 does not use the maximum numbers of the respective reference planes. According to the H.264 standard, the numbers of reference planes in use are stored in encoded form in the leading header part of compressed data, so that the operation unit 31 can know the number of reference planes in use before starting encoding processing.

According to the specific configuration example of the third embodiment, the data size information buffer 335 has a capacity which allows data size information about 64 reference planes to be stored using 128 bytes per reference plane.

Therefore, when the total number of luminance reference planes and color-difference reference planes does not exceed 32 (for example, when 16 each of luminance reference planes and color-difference reference planes are used), advance reading of data size information does not cause the data size information earlier-read in the same read operation to be discarded from the data size information buffer 335.

It is, therefore, desirable that, only on condition that the total number of luminance reference planes and color-difference reference planes is 32 or smaller, when 128 bytes of data size information including required data size information is read, the next 128 bytes of data size information contiguous in address from the preceding 128 bytes of data size information is also read as advance reading.

At this time, however, if the next 128 bytes of data size information is already stored in the data size information buffer 335, advance reading of the next 128 bytes of data size information is not carried out. This avoids useless reading of data size information, so that the consumption of the bus/memory bandwidth is further reduced.

(4) Other Embodiments

The invention made by the present inventors has been specifically described based on embodiments, but the invention is not limited to the foregoing embodiments and can be modified in various ways without departing from the scope of the invention.

For example, even though, in connection with the foregoing second and third embodiments, the auxiliary information used in reading compressed data is described as data size information indicating the data length of compressed data, the auxiliary information is not limited to such data size information. The auxiliary information may alternatively be address information indicating addresses on a memory at which compressed data is stored.

In such a case, address information about compressed data is stored as auxiliary information in the memory. When a read request is issued, the address included in the read request is replaced, based on the address information about the compressed data, with the address on the memory at which the compressed data is stored.

Also, the auxiliary information may include either or both of data size information and address information.

What is claimed is:

1. A semiconductor device comprising:
   (a) a cache to store auxiliary information for use in reading compressed data, the auxiliary information being also stored in a memory together with the compressed data, the auxiliary information being data size information indicating a data length of the compressed data;
   (b) a control unit which, when it receives a read request for reading a compressed data stored in the memory, reads from the cache auxiliary information about the compressed data if the auxiliary information is stored in the cache, or reads the auxiliary information about the compressed data from the memory and stores the auxiliary information about the compressed data in the cache if not stored in the cache, the request including a data address and a data length of the compressed data before compression, and which reads the compressed data from the memory using the auxiliary information about the compressed data and the data address included in the request,
   wherein, when reading the auxiliary information about the compressed data from the memory and storing the auxiliary information about the compressed data in the cache, the control unit reads auxiliary information of a predetermined unit for reading and stores in the cache the auxiliary information of the predetermined unit for reading, the auxiliary information of the predetermined unit for reading including the auxiliary information about the compressed data, and
   wherein, when reading auxiliary information of the predetermined unit for reading from the memory and storing the auxiliary information in the cache, the control unit also reads, as advance reading, auxiliary information of a next predetermined unit for reading and stores the auxiliary information of the next predetermined unit for reading in the cache, the auxiliary information of the predetermined unit for reading and the auxiliary information of the next predetermined unit for reading being contiguous in address.

2. The semiconductor device according to claim 1, wherein the control unit determines whether or not to read auxiliary information of the next predetermined unit for reading based on a capacity of the cache.

3. The semiconductor device according to claim 1, wherein, when the auxiliary information of the next predetermined unit for reading is already stored in the cache, the control unit does not read, as advance reading, the auxiliary information of the next predetermined unit for reading.

4. The semiconductor device according to claim 1, wherein the control unit holds management information indicating the auxiliary information stored in the cache and determines whether or not auxiliary information about the compressed data for which a read request has been received is stored in the cache.

5. The semiconductor device according to claim 1, wherein an order of storing compressed data in the memory and an order of storing auxiliary information about the compressed data in the memory are identical.

6. A data processing system comprising:
(a) a memory storing compressed data and auxiliary information for use in reading the compressed data; and
(b) the semiconductor device according to claim 1.

7. The data processing system according to claim 6, wherein the control unit determines whether or not to read auxiliary information of the next predetermined unit for reading based on a capacity of the cache.

8. The data processing system according to claim 6, wherein, when the auxiliary information of the next predetermined unit for reading is already stored in the cache, the control unit does not read, as advance reading, the auxiliary information of the next predetermined unit for reading.

9. A semiconductor device control method comprising the steps of:
(a) when a read request is received for reading compressed data stored in a memory, determining whether or not auxiliary information which is stored together with the compressed data in the memory for use in reading the compressed data is also stored in the cache, the auxiliary information being data size information indicating a data length of the compressed data, the request including a data address and a data length of the compressed data before compression;
(b) reading from the cache the auxiliary information about the compressed data if stored in the cache, or reading the auxiliary information about the compressed data from the memory and storing the auxiliary information about the compressed data in the cache if not stored in the cache, and reading the compressed data from the memory using the auxiliary information about the compressed data and the data address included in the request; and
(c) expanding the compressed data read from the memory,
wherein, when the auxiliary information about the compressed data is to be read from the memory and is to be stored in the cache, auxiliary information of a predetermined unit for reading is read and is stored in the cache, the auxiliary information of the predetermined unit for reading including the auxiliary information about the compressed data, and
wherein, when auxiliary information of the predetermined unit for reading is read from the memory and is stored in the cache, auxiliary information of a next predetermined unit for reading is also read, as advance reading, and is stored in the cache, the auxiliary information of the predetermined unit for reading and the auxiliary information of the next predetermined unit for reading being contiguous in address.

10. The semiconductor device control method according to claim 9, wherein whether or not to read the auxiliary information of the next predetermined unit for reading is determined based on a capacity of the cache.

11. The semiconductor device control method according to claim 9, wherein, when the auxiliary information of the next predetermined unit for reading is already stored in the cache, the auxiliary information of the next predetermined unit for reading is not read as advance reading.

* * * * *